UNITED STATES PATENT OFFICE.

CHARLES E. W. WOODWARD, OF CAMBRIDGE, MASSACHUSETTS.

PROCESS OF TREATING INDIA-RUBBER.

SPECIFICATION forming part of Letters Patent No. 260,441, dated July 4, 1882.

Application filed March 27, 1882. (No specimens.)

*To all whom it may concern:*

Be it known that I, CHARLES E. W. WOODWARD, a citizen of the United States, residing at Cambridge, in the county of Middlesex and State of Massachusetts, have invented certain new and useful Improvements in Process of Treating India-Rubber; and I do hereby declare that the same are fully described in the following specification.

This invention relates to an improved process for treating india-rubber either in its pure state or after being vulcanized or combined with sulphur, earthy substances, metallic oxides, carbonates, sulphurets, or other substances, and known in the market as "india-rubber," "vulcanized rubber," "pure gum," &c.

The object of my improved process is to prepare the surface of such india-rubber or rubber compound so that it may be adapted to be secured by means of glue, mucilage, paste, varnish, gums, resin, cement, or other adhesive compound or material to wood, leather, paper, glass, or other materials.

To adapt the india-rubber or india-rubber compound for adhesion to materials as above named, it is necessary to produce a material change in the surface of the rubber which is to be secured to the desired object, and for this purpose I proceed as follows:

The surface of the rubber or rubber compound which is required for adhesion to other object or objects is submitted to the action of concentrated sulphuric acid (known also in the market as "oil of vitriol") of about 1.84 specific gravity as compared with water at a temperature of 60° Fahrenheit, or not materially differing therefrom. The said acid may be applied to the rubber surface either by dipping it into the acid or by applying the acid to it by means of a die, stamp, brush, or other suitable means. The action of the acid is continued for about the space of one minute, and it is then arrested by washing the surface exposed to the acid with water, which is continued until all traces of the acid are removed. The rubber surface thus treated, after having been dried, is found to be materially and chemically changed, and to possess new and valuable properties. It has become strongly adherent to glues, mucilage, paste, varnish, gums, resin, cement, or other adhesive compounds or materials, and by means of such adhesive materials it can be securely fastened to any other substance or material capable of adhesion with the adhesive substances mentioned, and the junction thus made is stronger than the rubber itself, so that, under strain, it will part at any other point sooner than at the point of junction. The prepared surface of the rubber forms an integral part of it and cannot be removed.

The temperature at which the process of treating the rubber is carried out will be found to vary somewhat in practice with the quality of the rubber and nature of the rubber compound, and also with the time during which it is subjected to the action of the acid. The temperature should, however, generally range about 70°, and may be as high as 212° Fahrenheit in treating some rubber compounds, if the time of the action of the acid is shortened. An acid materially weaker than that stated hereinbefore will not produce the desired effect.

Having thus fully described the nature of my improved process, I wish to secure by Letters Patent, and claim—

1. The herein-described process of treating articles of rubber or rubber compounds, consisting in subjecting them for a limited time to the action of concentrated sulphuric acid and immediately washing them to remove the acid, substantially as herein described.

2. The herein-described improvement in the process of securing rubber articles to surfaces, consisting in subjecting such articles to the action of concentrated sulphuric acid, arresting the action of the acid as specified, and applying a suitable adhesive material between the rubber article as treated and the surface to which it is to be secured, substantially as herein described.

In testimony whereof I have affixed my signature in presence of two witnesses.

CHARLES E. W. WOODWARD.

Witnesses:
ALBAN ANDRÉN,
ELIJAH E. SUMMERS.